(12) United States Patent
Hunt et al.

(10) Patent No.: US 9,389,725 B2
(45) Date of Patent: Jul. 12, 2016

(54) DETECTING A TOUCH EVENT USING A FIRST TOUCH INTERFACE AND A SECOND TOUCH INTERFACE

(75) Inventors: John Miles Hunt, Raleigh, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 228 days.

(21) Appl. No.: 13/585,558

(22) Filed: Aug. 14, 2012

(65) Prior Publication Data

US 2014/0049518 A1 Feb. 20, 2014

(51) Int. Cl.
*G06F 3/042* (2006.01)
*G06F 3/041* (2006.01)
*G06F 3/043* (2006.01)
*G06F 3/044* (2006.01)

(52) U.S. Cl.
CPC .............. *G06F 3/0416* (2013.01); *G06F 3/043* (2013.01); *G06F 3/044* (2013.01); *G06F 3/0421* (2013.01)

(58) Field of Classification Search
None
See application file for complete search history.

(56) References Cited

U.S. PATENT DOCUMENTS

| | | | | |
|---|---|---|---|---|
| 2008/0018612 A1* | 1/2008 | Nakamura | ............ | G06F 3/0354 345/173 |
| 2009/0244015 A1* | 10/2009 | Sengupta et al. | ............. | 345/173 |
| 2009/0244026 A1* | 10/2009 | Purdy | ..................... | G06F 3/042 345/174 |
| 2011/0043227 A1* | 2/2011 | Pance et al. | ................... | 324/681 |
| 2011/0248961 A1* | 10/2011 | Svajda et al. | ................. | 345/175 |
| 2012/0262407 A1* | 10/2012 | Hinckley et al. | ............. | 345/173 |
| 2014/0006830 A1* | 1/2014 | Kamhi | .................. | G06F 1/3287 713/324 |

* cited by examiner

*Primary Examiner* — Joseph Haley
*Assistant Examiner* — Ifedayo Iluyomade
(74) *Attorney, Agent, or Firm* — Kunzler Law Group

(57) ABSTRACT

An apparatus for detecting a touch event using a first touch interface and a second touch interface includes one or more touch-sensitive sensors, a first touch interface, and a second touch interface. The first touch interface includes an optical touch interface. The second touch interface is of a different type than the first touch interface. The apparatus also includes a storage device storing machine-readable code and a processor executing the machine-readable code. The machine-readable code includes a first interface module determining a touch position on the one or more touch-sensitive sensors using the first touch interface. The machine-readable code further includes a second interface module detecting a touch contact on the one or more touch-sensitive sensors using the second touch interface.

13 Claims, 6 Drawing Sheets

DETECTING A TOUCH EVENT USING A FIRST TOUCH INTERFACE AND A SECOND TOUCH INTERFACE

BACKGROUND

1. Field

The subject matter disclosed herein relates to detecting a touch event and more particularly relates to using a first touch interface and second touch interface to detect a touch event.

2. Description of the Related Art

The use of capacitive touchscreens in small electronic devices, such as smartphones, personal desktop assistants ("PDA"s), and tablet computers, has proliferated, and with it, the capabilities of these small electronic devices. Many of these touchscreens, in general, are accurate and responsive, which has enabled a revolution in user interface design. However, these touchscreens become more expensive to implement as the size of the touchscreen increases.

As a result of the increased cost, touch interfaces, such as optical touch interfaces, whose cost is not necessarily tied to screen size, have been employed on larger touchscreens. Optical touch interfaces work by sensing the occlusion of light from opposing arrays of light-emitting diodes caused by a touch input that comes near the surface of the screen.

BRIEF SUMMARY

Based on the foregoing discussion, the inventors have recognized a need for an apparatus, system, and method for detecting a touch event using a first touch interface and a second touch interface. Such an apparatus, system, and method would provide a cost effective and efficient touch detection mechanism for touchscreen displays with diagonal viewing areas above a certain size.

The embodiments of the present subject matter have been developed in response to the present state of the art, and in particular, in response to the problems and needs in the art that have not yet been fully solved by currently available touch sensors. Accordingly, the embodiments have been developed to provide a method, apparatus, and system for detecting a touch event using a first touch interface and a second touch interface.

An apparatus is provided that includes one or more touch-sensitive sensors, a first touch interface, and a second touch interface. In one embodiment, the first touch interface for the one or more touch-sensitive sensors includes an optical touch interface. In one embodiment, the second touch interface for the one or more touch-sensitive sensors is of a different type than the first touch interface. The apparatus also includes, in one embodiment, a storage device storing machine-readable code, and a processor executing the machine-readable code. In one embodiment, the machine-readable code includes a first interface module and a second interface module.

In one embodiment, the first interface module determines a touch position on the one or more touch-sensitive sensors using the first touch interface. In one embodiment, the second interface module detects a touch contact on the one or more touch sensitive sensors using the second touch interface.

A method is also presented, that in the disclosed embodiments, substantially includes the steps to carry out the functions presented above with respect to the operation of the described apparatus. In one embodiment, the method includes determining a touch position on one or more touch sensitive sensors using a first touch interface. The first touch interface, in a further embodiment, includes an optical touch interface. In one embodiment, the method includes detecting a touch contact on the one or more touch-sensitive sensors using a second touch interface. In a further embodiment, the second touch interface is of a different type than the first touch interface.

A computer program product including a storage device storing machine readable code executed by a processor to perform operations is also presented. In one embodiment, the operations include determining a touch position on one or more touch sensitive sensors using a first touch interface. The first touch interface, in a further embodiment, includes an optical touch interface. In one embodiment, the operations include detecting a touch contact on the one or more touch-sensitive sensors using a second touch interface. In a further embodiment, the second touch interface is of a different type than the first touch interface.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
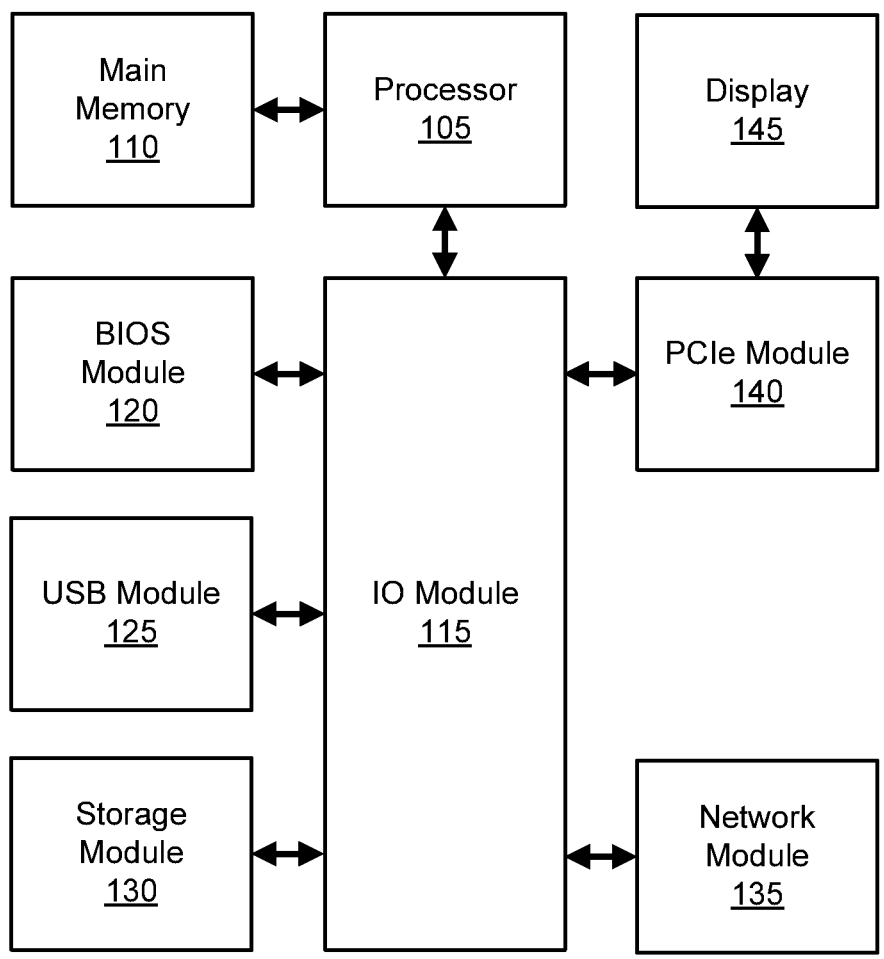
FIG. 1 is a schematic block diagram illustrating one embodiment of an information handling device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface (UEFI), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2:
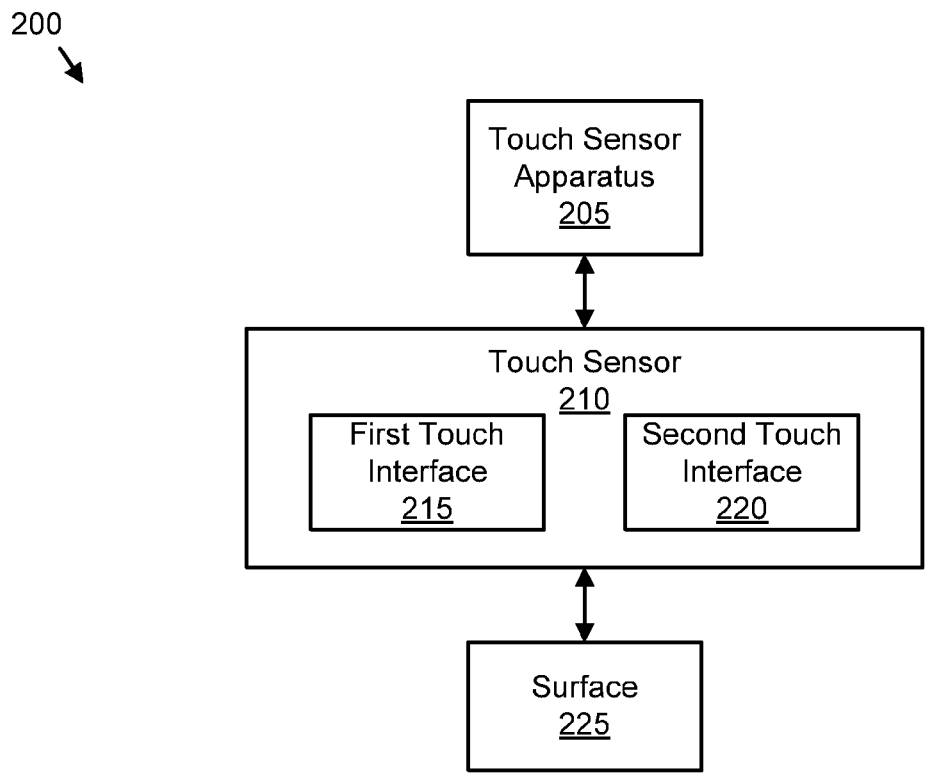
FIG. 2 is a schematic block diagram illustrating one embodiment of a system for detecting a touch event using a first touch interface and a second touch interface in accordance with the present subject matter.

FIG. 2 depicts one embodiment of a system 200 for detecting a touch event using a first touch interface and a second touch interface. The system 200 may allow a user to interact with an information handling device, such as a smart phone or tablet, via the touch sensor 210 and the surface 225. The system 200 includes a touch sensor apparatus 205, a touch sensor 210, and a surface 225. The touch sensor 210 includes a first touch interface 215 and a second touch interface 220 for detecting a touch event.

In one embodiment, the touch sensor 210 monitors for, detects, and/or determines touch input directed at the surface 225. Touch input directed at the surface 225 may include physical contact of a touching object such as a finger or stylus on the surface 225, a touching object in sensing proximity to the surface 225 (e.g. within a predetermined distance of the surface 225, or the like. Furthermore, the surface 225 may include a touchpad, a display, a screen of an information handling device, or the like. For example, the surface 225 may be a screen of a tablet device or a smart phone. In other embodiments, the surface 225 may be a display having a diagonal viewing area above a predetermined size, such as, for example a monitor, a television set, or the like. In one embodiment, a user may interact with the surface 225 by using a finger and/or thumb as the touch input. In other embodiments, the touch input may come from a stylus or other touch object used to interact with a touchscreen display. The touch sensor 210 may be integrated with the surface 225 or may otherwise detect, monitor, and/or determine touch input on the surface 225. The touch sensor 210 may include hardware and/or software components to implement the first touch interface 215 and the second touch interface 220. As used herein, a touch interface refers to a manner, process, and or implementation in which one or more touch sensors detect, monitor, and/or determine touch input directed at a surface.

Typically, a conventional touch sensor 210 and/or surface 225 of an information handling device employ a single touch interface for touch input. Touch input may include a touch position—a position of a touching object proximate to one or more touch-sensitive sensors and/or a surface associated with a touch sensor. A touch position may include a coordinate position in an XY-plane of touch sensor and/or surface. Touch input may also include a touch contact—a contact of the touching object on one or more touch sensitive sensors and/or a surface associated with the one or more touch-sensitive sensors. One such touch interface is a capacitive touch interface. A capacitive touch interface detects touch input by measuring a change in capacitance, or a change in an electrostatic field. For example, a touch sensor with a capacitive touch interface may comprise a touchscreen that detects touch input when a user places a finger against the touchscreen changing the electrostatic field of the screen. In one embodiment, a capacitive touch interface includes a touchscreen with a grid of conductive material. Current applied to the grid may produce the electrostatic field. Capacitive touch interfaces are generally accurate at detecting touch input. However, implementing a capacitive touch interface on a larger display, such as a display with a diagonal viewing areas greater than 20 inches, may be expensive.

Touch sensors with touch interfaces whose cost is not necessarily tied to screen size, such as optical touch interfaces, have been employed on larger touchscreens. Optical touch interfaces work by sensing the occlusion of light from opposing arrays of light-emitting diodes caused by a touch input that comes near the surface of the screen. Optical touch interfaces may provide good positional touch accuracy and are typically less expensive than other types of sensors, especially for displays with large diagonal viewing areas (e.g. greater than 20 inches). However, optical touch interfaces may be less accurate in detecting an actual touch contact on a surface. For example, a touching object, such as a finger or stylus, may be held just off the surface and still occlude enough light to trigger the optical sensor. Therefore, while certain touch interfaces may be less expensive when implemented on larger displays, the accuracy of the touch interface may suffer.

Consequently, the system 200 includes a touch sensor 210 with two touch interfaces: a first touch interface 215 and a second touch interface 220, and a touch sensor apparatus 205 to manage the first and second touch interfaces 215, 220 to detect a touch event on the surface 225. In one embodiment, the touch sensor apparatus 205 uses the first touch interface 215 to determine a touch position and uses the second touch interface 220 to detect a touch contact. In one embodiment, the first touch interface 215 is of a different type than the second touch interface 220. A touch interface type may refer to a particular manner, process, and or implementation of a touch interface. Types of touch interfaces may include, but are not limited to capacitive touch interfaces, surface acoustic wave (SAW) touch interfaces, optical touch interfaces, or the like.

In one embodiment, the first touch interface 215 includes a touch interface suited to determining a touch position. In some embodiments the first touch interface 215 includes an optical touch interface, as described above. In one embodiment, the optical touch interface may be limited such that the touch sensor apparatus 205 uses the first touch interface 215 to determine a touch position in the XY-plane of the surface 225 and not the actual presence of a touch contact on the surface 225. The actual presence of a touch contact may be determined by the second touch interface 220.

In one embodiment, the second touch interface 220 includes a touch interface suited to determining a touch contact. In one embodiment, the second touch interface 220 includes a limited capability capacitive film that is capable of determining the presence of a touch on the surface 225 and not necessarily a touch position (the position of the touch in the XY-plane of the surface 225) as described below. In one embodiment, the limited capacitive film is less expensive than traditional full-capacitive films, making it better suited for larger displays, such as those with a diagonal viewing area greater than 20 inches. Alternatively, the second touch interface 220 may include a SAW touch interface which, similar to the limited capacitive film, may not be used to determine a location of a touch input in the XY-plane, just the presence of a touch contact on the surface 225.

In one embodiment, all or a portion of the touch sensor apparatus 205 comprises a computer readable program stored and executed by an information handling device. In one embodiment, the touch sensor apparatus 205 includes an application executing on an operating system of an information handling device and/or is integrated with the operating system.

In one embodiment, the surface 225, the touch sensor 210, including the first touch interface 215 and the second touch interface 220, and the touch sensor apparatus 205 are encompassed in a single information handling device, such as a tablet or an all-in-one desktop computer. In another embodiment, the surface 225 and the sensor 210, including the first touch interface 215 and the second touch interface 220, are found on a unit separate from the touch sensor apparatus 205. For example, the touch sensor apparatus 205 may be found on a desktop computer while the sensor 210 and the surface 225 are found on an external display monitor connected to the desktop computer.

The information handling device implementing the touch sensor apparatus 205, the touch sensor 210, and/or the surface 225, may include memory, a storage device storing computer readable programs, and a processor that executes the computer readable programs as is known to those skilled in the art. The information handling device may comprise embodiments of the information handling device 100 depicted in FIG. 1 or comprise at least a portion of the components of the information handling device 100. In one embodiment, the information handling device is a portable or handheld device such as a personal desktop assistant ("PDA"), a tablet computer, a slate computer, an e-Book reader, a mobile phone, a smartphone, and the like. In one embodiment, the information handling device is a desktop computer, a portable computer, a tablet computer, a laptop computer, a server, a mainframe computer, and/or the like.

Figure 3:
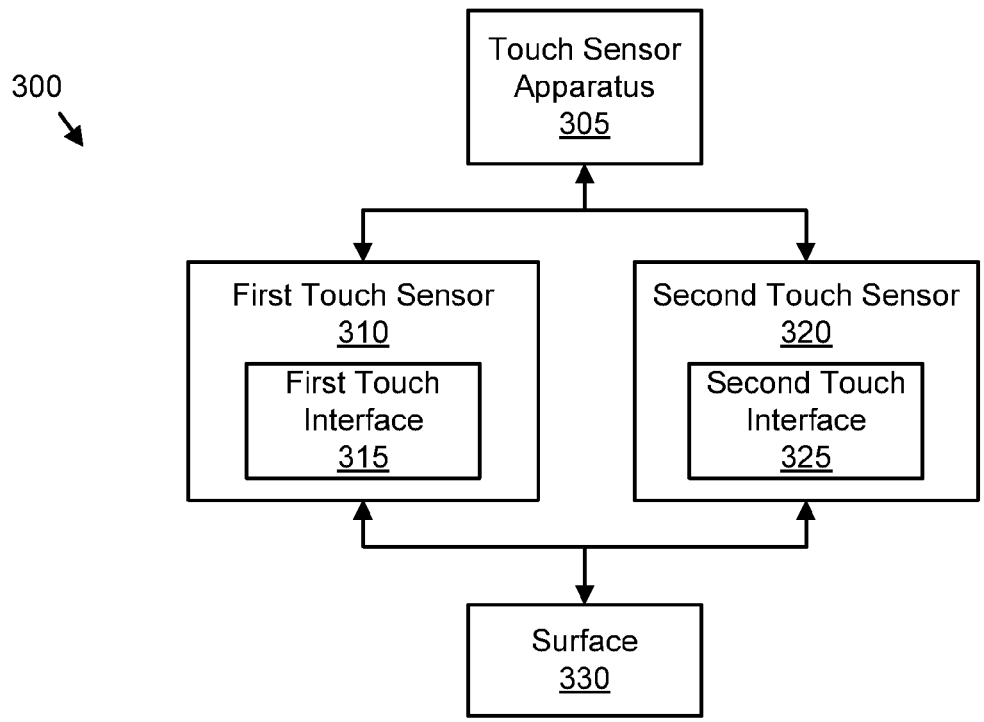
FIG. 3 is a schematic block diagram illustrating another embodiment of a system for detecting a touch event using a first touch interface and a second touch interface in accordance with the present subject matter.

FIG. 3 depicts another embodiment of a system 300 for detecting a touch event using a first touch interface and a second touch interface. Similar to the system 200 of FIG. 2, the system 300 includes a touch sensor apparatus 305, a first touch interface 315, a second touch interface 325, and a surface 330. However, in the depicted embodiment, the first touch interface 315 is included in two separate touch sensors. The first touch interface 315 is included with the first touch sensor 310 and the second touch interface 325 is included with the second touch sensor 320.

In one embodiment, the system 300 includes a surface 330, similar to the surface 225 as described in the system 200 above, two touch sensors: a first touch sensor 310 and a second touch sensor 320. The first touch sensor 310 includes a first touch interface 315, which may similar to the first touch interface 215 described above. The first touch interface 315 may be, but is not limited to, an optical touch interface. The second touch sensor 320 includes a second touch interface 325, which may be similar to the second touch interface 220 described above. The second touch interface 325 may be, but is not limited to, a capacitive film or a SAW interface.

Figure 4A:
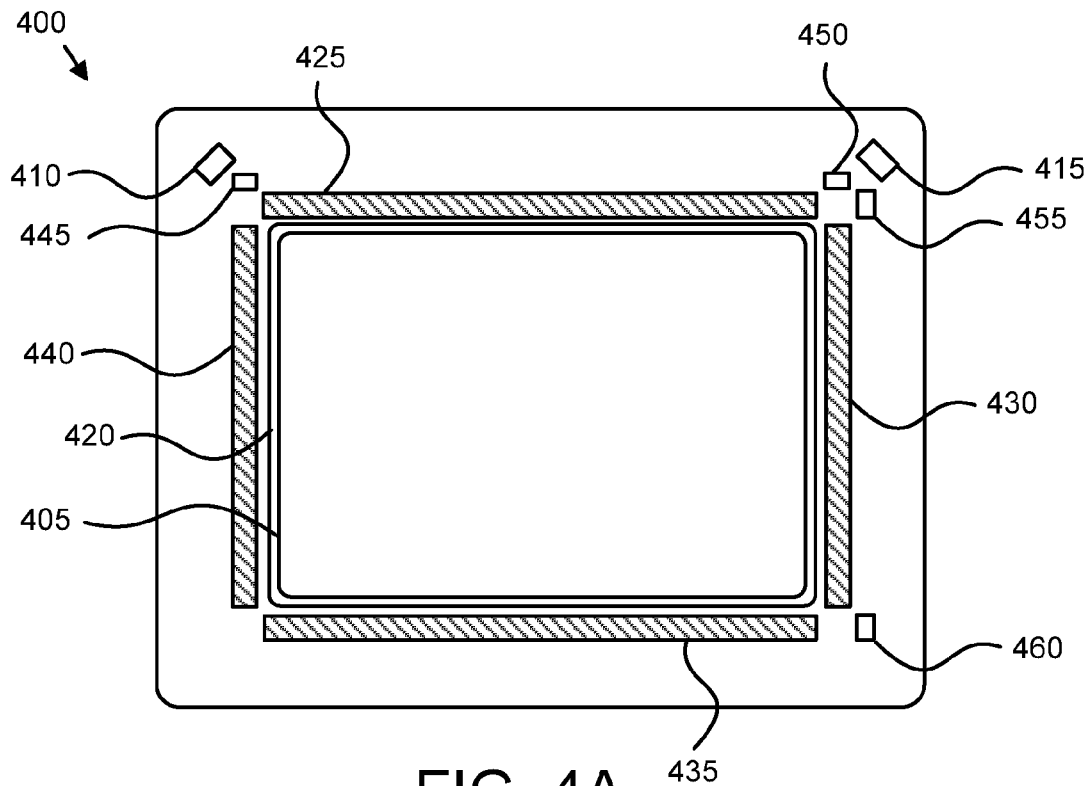
FIG. 4A is a perspective view illustrating one embodiment of a touchscreen for detecting a touch event using a first touch interface and a second touch interface in accordance with the present subject matter.

FIG. 4A depicts one embodiment of a system 400 for detecting a touch event using a first touch interface and a second touch interface. Specifically, the system 400 of FIG. 4A includes components for both an optical touch interface and a Surface Acoustic Wave (SAW) touch interface. In the embodiment as depicted, the first touch interface (the optical touch interface) includes optical sensing units 410, 415 used to determine a touch position on a surface comprising a screen or display 405 of an information handling device. The optical sensing units 410, 415 are placed around the edges of the screen 405 while a backlight 420 is placed in the optical sensing units' field of view on the opposite sides of the screen 405. In some embodiments, the optical sensing units may be cameras, image sensors, and the like. Further, the backlight 420 may include light-emitting diodes ("LED"), infrared light, and the like. As a user moves a touch object, such as a finger or stylus, around the surface of the screen 405, the optical sensing units 410, 415 are able to locate the position of the touching object by the shadow that the object casts. The optical sensing 410, 415, in some embodiments, may also determine a size of the touching object.

The second touch interface depicted in FIG. 4A is a SAW interface that includes reflector arrays 425, 430, 435, 440, and transducers 445, 450, 455, 460, to determine a touch contact on the screen 405. In one embodiment, the transducers are arranged such that there are Y-axis transmitting 445 and receiving 450 transducers and X-axis transmitting 455 and receiving 460 transducers. In one embodiment, as is known in the art, the screen 405 has a controller that sends an electric signal to the transmitting transducers 445, 455, which converts the signal into ultrasonic acoustic waves within the screen 405. The acoustic waves are directed across the screen 405 by the reflector arrays 425, 430, 435, 440, to the receiving transducers 450, 460, creating a digital map. When a user touches the screen 405 with a finger, for example, a portion of the acoustic wave is absorbed. The received signal is then compared with the digital map, which indicates that something has changes, i.e., something has touched the screen 405.

Figure 4B:
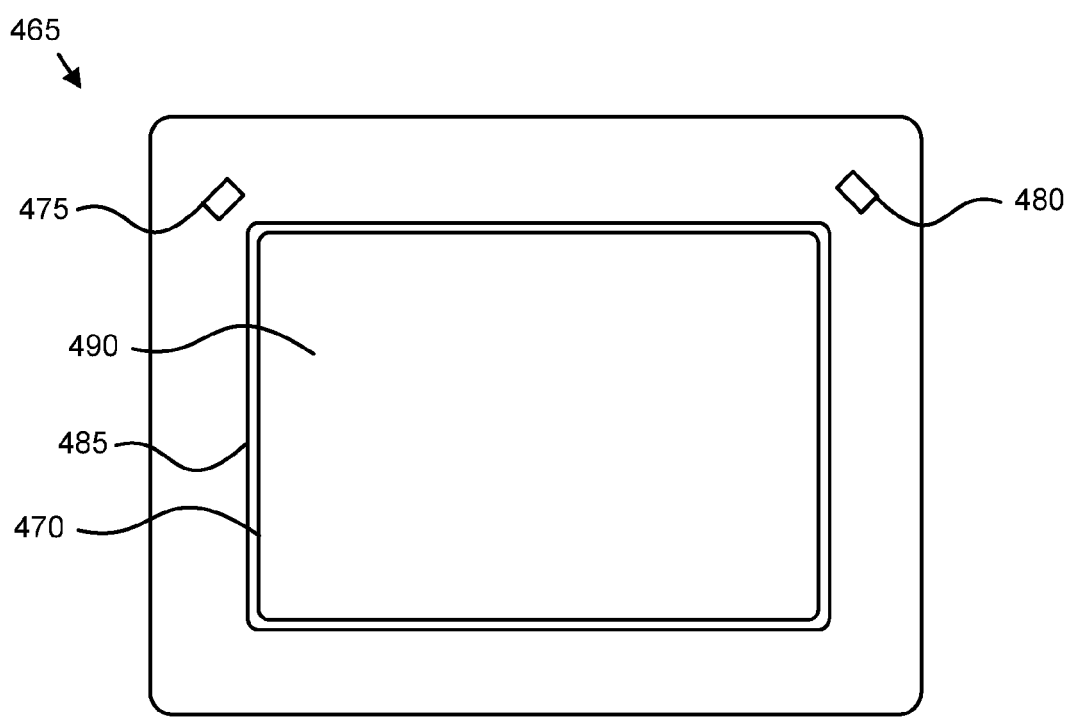
FIG. 4B is a another perspective view of a touchscreen for detecting a touch event using a first touch interface and a second touch interface in accordance with the present subject matter.

FIG. 4B depicts another embodiment of a system 465 for detecting a touch event using a first touch interface and a second touch interface. Specifically, the system 400 of FIG. 4B includes components for both an optical touch interface and a limited capacitive touch interface. In the embodiment as depicted, the first touch interface includes optical sensing units 475, 480 used to determine a touch position on a screen 470 of an information handling device, as described above in FIG. 4A. The second touch interface, in the embodiment as shown, is a capacitive film 490 used to detect a touch contact on the screen 470. In some embodiments, the capacitive film 490 of the second touch interface is limited such that the second touch interface only detects a touch contact while disregarding touch position information and/or is unable to detect a touch position.

Figure 5:
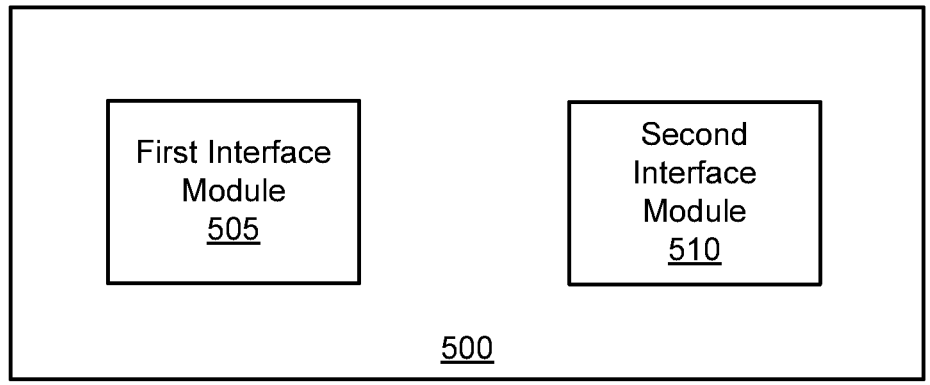
FIG. 5 is a schematic block diagram illustrating one embodiment of an apparatus for detecting a touch event using a first touch interface and a second touch interface in accordance with the present subject matter.

FIG. 5 illustrates one embodiment of an apparatus 500 for detecting a touch event using a first touch interface and a second touch interface. The apparatus 500 may comprise one embodiment of the touch sensor apparatus depicted in FIG. 2 or FIG. 3. The apparatus 500 includes a first interface module 505 and a second interface module 510.

The first interface module 505, in one embodiment, uses a first touch interface to determine a touch position on one or more touch-sensitive sensors. In one embodiment, the first touch interface is an optical touch interface embodied by and/or implemented by one or more touch-sensitive sensors as described above.

In one embodiment, determining the touch position on the one or more touch-sensitive sensors include determining the touch position on a surface associated with, integrated with, and/or in communication with, the one or more touch-sensitive sensors. A touch position includes a position and/or location of a touching object proximate to a surface associated with the one or more touch-sensitive sensors. The touching object may be in direct contact with the surface and/or be within a predetermined distance of the surface. The first touch interface may determine the touch position by determining touch position information. Touch position information may include location information, such as XY coordinate information (e.g. a point on the surface), of the touching object proximate to the surface.

In one embodiment, the first touch interface 215, in addition to determining touch position information, also determines touch contact information. Touch contact information may include information indicating that a touching object is making contact with the surface. For example, in one embodiment for an optical touch interface, touch contact information may include an indication of an occlusion of light at a certain location on the surface indicative of what the optical touch interface considers to be a touch contact. In one embodiment, the first interface module 505 disregards the touch contact information from the first touch interface 215.

The second interface module 510, in one embodiment, uses the second touch interface to detect a touch contact on the one or more touch-sensitive sensors. The touch contact may include a contact of a touching object on a surface associated with the one or more touch-sensitive sensors. The touching object may include a finger, a stylus, or the like. In one embodiment, the second touch interface is of a different type than the first touch interface as described above. In a further embodiment, the first touch interface is an optical touch interface and the second touch interface is a touch interface other than an optical touch interface. In some embodiments, the second touch interface includes, but is not limited to, a capacitive film or SAW touch interface.

The second touch interface, in one embodiment, includes a limited touch interface that has limited touch position sensing capabilities. In a further embodiment, the second touch interface does not determine touch position information on the touch-sensitive sensor. For example, the second touch interface may be incapable of determining touch position information and/or determining touch position information with a predetermined accuracy. In this embodiment, the second touch interface may include a capacitive film on one side of the surface. This capacitive film, in certain embodiments, may lack the resolution to determine a touch position within a certain accuracy. In another embodiment, the second touch interface may determine touch information associated with the touch position on the touch-sensitive sensor and the second interface module disregards the touch position information detected by the second touch interface.

Figure 6:
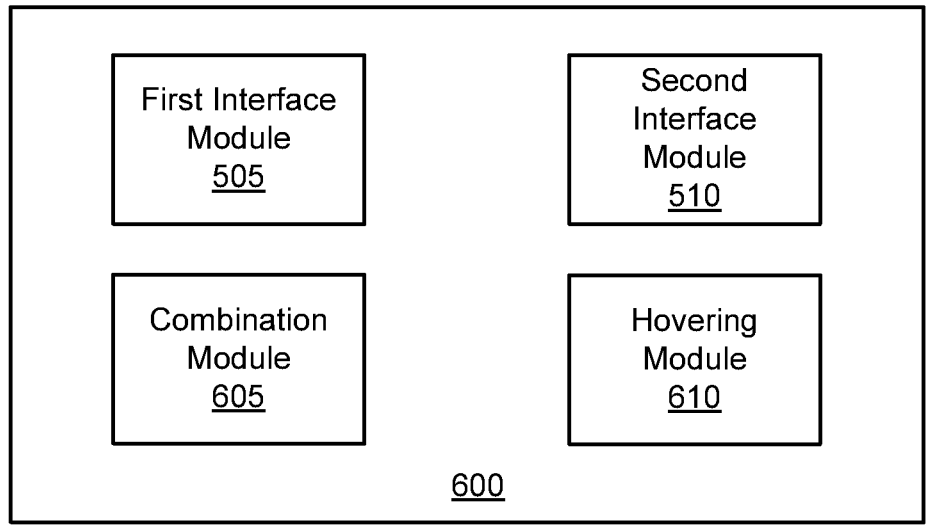
FIG. 6 is a schematic block diagram illustrating another embodiment of an apparatus for detecting a touch event using a first touch interface and a second touch interface in accordance with the present subject matter.

In one embodiment, the first and second touch interfaces are implemented by and/or are embodied as a single touch-sensitive sensor, two or more touch-sensitive sensors, or the like. In one embodiment, the one or more touch-sensitive sensors comprise a display. For example, the one or more touch-sensitive sensors and the surface may be embodied as a touchscreen. In one embodiment, the display has a diagonal display size greater than 20 inches FIG. 6 illustrates another embodiment of an apparatus 600 for detecting a touch event using a first touch interface and a second touch interface. The apparatus 600 may comprise one embodiment of the touch sensor apparatus depicted in FIG. 2 or FIG. 3. The apparatus 600 includes the first interface module 505 and the second interface module 510, which may be substantially similar to the like named modules of FIG. 5. In addition, the apparatus 600 includes a combination module 605 and a hovering module 610.

The combination module 605, in one embodiment, combines the touch position sensed by the first touch interface with the touch contact sensed by the second touch interface into a touch event. For example, in one embodiment, the first touch interface may include an optical touch interface configured to determine a touch position on a surface of an information handling device and the second touch interface may include a limited capability capacitive film that detects a touch contact on the surface of the information handling device. The combination module 605 may receive the touch position information from the first touch interface and the touch contact information from the capacitive film of the second touch interface and combine them into a touch event. A touch event may include both an indication that touching object has made contact with a surface and/or touch-sensitive sensor and a touch position with a location on the surface and/or touch sensitive sensor in which the touch contact occurred.

The hovering module 610, in one embodiment, translates the touch position determined by the first interface module 505 into a user interface response prior to the second interface module 510 detecting a touch contact. For example, in one embodiment, the optical sensor of the first touch interface may detect the position of a touch input object, such as a finger or stylus, as it hovers close to the surface of the display of the information handling device. The second touch interface, such as a capacitive film or SAW interface, does not detect a touch contact on the surface of the information handling device until there is an actual presence of a touch input on the surface. The hovering module 610 receives the touch position information from the first interface module 505 and creates a user interface response on the user interface. A user interface response, in one embodiment, is a motion-based response such as a cursor movement. For example, a user may move a mouse cursor around a graphical user interface on a display by moving an input object, such as a finger, near the surface of a touchscreen.

Figures 7A, 7B:
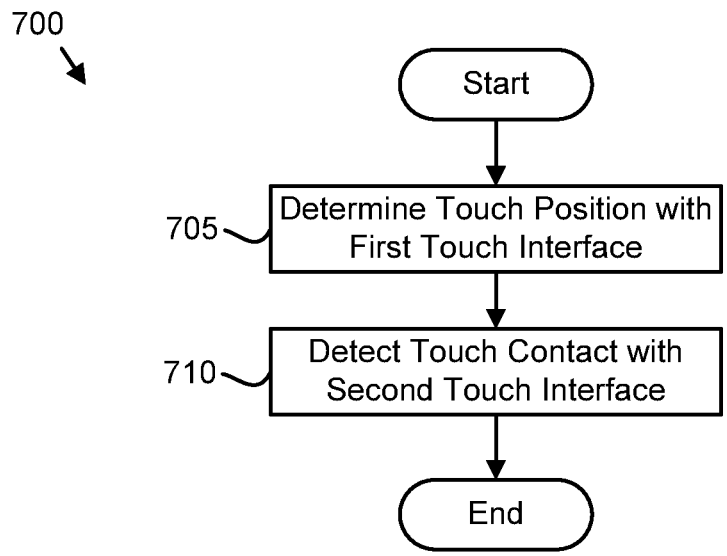
FIG. 7A is a schematic flow chart diagram illustrating one embodiment of a method for detecting a touch event using a first touch interface and a second touch interface in accordance with the present subject matter.
FIG. 7B is a schematic flow chart diagram illustrating another embodiment of a method for detecting a touch event using a first touch interface and a second touch interface in accordance with the present subject matter.

FIG. 7A illustrates one embodiment of a method 700 for detecting a touch event using a first touch interface and a second touch interface. The method 700 begins and the first interface module 505 determines 705 a touch position on one or more touch-sensitive sensors using a first touch interface. In one embodiment, the first touch interface is an optical touch interface. The second interface module 510 detects 710 a touch contact on the one or more touch-sensitive sensors using a second touch interface. The second touch interface is of a different type than the first touch interface. The second touch interface may be a capacitive film with limited capacitive touch sensing capabilities or a SAW touch interface. Then the method 700 ends.

FIG. 7B illustrates one embodiment of a method 715 for detecting a touch event using a first touch interface and a second touch interface. The method 715 begins and the first interface module 505 determines 720 a touch position using touch position information from a first touch interface. If a touch contact is not detected 725 by the second interface module 510, the first interface module 505 continues to determine a touch position using the first touch interface. Otherwise, if a touch contact is detected by the second interface module 510, the touch position sensed by the first touch interface and the touch contact sensed by the second touch interface are combined 730 by the combination module 605 into a touch event. Then the method 715 ends.

Figure 8:
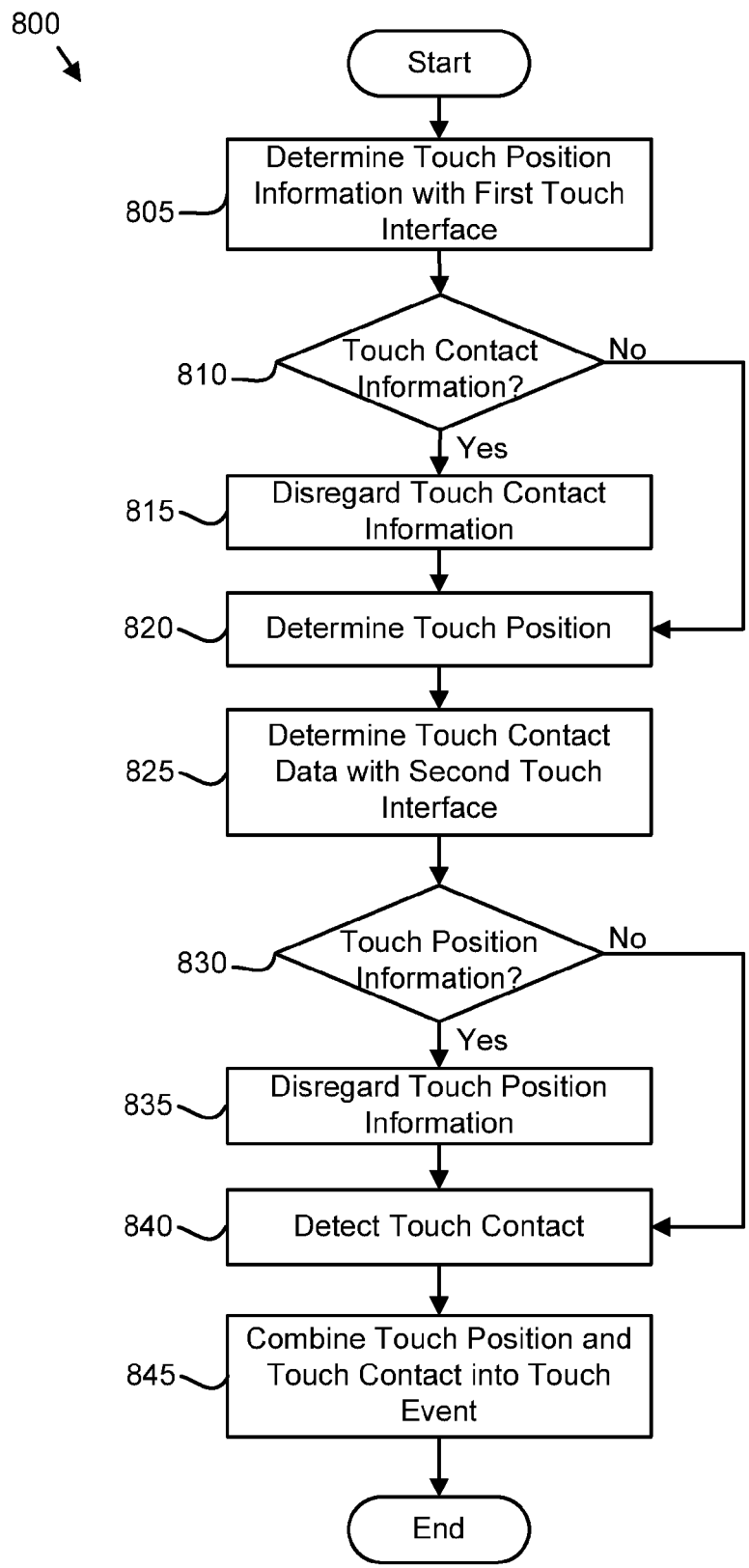
FIG. 8 is a schematic flow chart diagram illustrating yet another embodiment of a method for detecting a touch event using a first touch interface and a second touch interface in accordance with the present subject matter.

FIG. 8 illustrates one embodiment of a method 800 for detecting a touch event using a first touch interface and a second touch interface. The method 800 begins and the first touch interface determines 805 touch position data detected on a surface associated with an information handling device, such as a touchscreen of a tablet. In some embodiments, if touch contact information is also detected 810 by the first touch interface, the first interface module 505 disregards 815 the touch contact information. Otherwise, the first interface module 505 determines a touch position 820 using the touch position information received from the first touch interface.

The second touch interface determines 825 touch contact information from a touch contact detected on the surface associated with the information handling device. In some embodiments, if touch position information is also detected 830 by the second touch interface, the second interface module 510 disregards 835 the touch position information. Otherwise, the second interface module 510 detects a touch contact 840 using the touch contact information received from the second touch interface. The touch position sensed by the first touch interface and the touch contact sensed by the second touch interface are combined 845 by the combination module 605 into a touch event. Then the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more touch-sensitive sensors;
   a first touch interface for the one or more touch-sensitive sensors, the first touch interface comprising an optical touch interface;
   a second touch interface for the one or more touch-sensitive sensors, the second touch interface being of a different type than the first touch interface;
   a processor;
   a memory that stores code executable by the processor to:
   determine a touch position from the one or more touch-sensitive sensors of the first touch interface;
   disregard touch contact information from the first touch interface in response to receiving touch contact information from the first touch interface;
   translate the touch position determined by the first interface module into a user interface response comprising a cursor movement prior to a second interface module detecting a touch contact;
   detect the touch contact from the one or more touch-sensitive sensors of the second touch interface concurrent with the first interface module determining the touch position;
   disregard touch position information from the second touch interface in response to receiving the touch position information from the second touch interface; and
   combine the touch position determined by the first touch interface with the touch contact detected by the second touch interface into a touch event.

2. The apparatus of claim 1, wherein the touch position comprises a position of a touching object proximate to a surface associated with the one or more touch-sensitive sensors and wherein the touch contact comprises a contact of the touching object on the surface associated with the one or more touch-sensitive sensors.

3. The apparatus of claim 1, wherein the second touch interface comprises a limited touch interface having one or more of limited touch contact sensing and touch position sensing capabilities.

4. The apparatus of claim 1, wherein the second touch interface determines touch position information associated with the touch position on the one or more touch-sensitive sensors.

5. The apparatus of claim 1, wherein the first touch interface determines touch contact information associated with the touch contact on the one or more touch-sensitive sensors.

6. The apparatus of claim 1, wherein the second touch interface comprises one of a capacitive touch interface or a surface acoustic wave (SAW) touch interface.

7. The apparatus of claim 1, wherein the one or more touch-sensitive sensors comprise a display.

8. The apparatus of claim 7, wherein the display has a diagonal display size greater than 20 inches.

9. A method comprising:
   determining, by use of a processor, a touch position from one or more touch-sensitive sensors of a first touch interface, the first touch interface comprising an optical touch interface;
   disregarding touch contact information from the first touch interface in response to receiving touch contact information from the first touch interface;
   translating the touch position determined by the first interface module into a user interface response comprising a cursor movement prior to a second interface module detecting a touch contact;
   detecting the touch contact from the one or more touch-sensitive sensors of the second touch interface concurrent with the first interface module determining the touch position, the second touch interface being of a different type than the first touch interface;
   disregarding touch position information from the second touch interface in response to receiving the touch position information from the second touch interface; and
   combining the touch position determined by the first touch interface with the touch contact detected by the second touch interface into a touch event.

10. The method of claim 9, wherein the second touch interface comprises one of a capacitive touch interface or a surface acoustic wave (SAW) touch interface.

11. A computer program product comprising a storage device storing machine readable code executed by a processor to perform the operations of:
   determining a touch position from one or more touch-sensitive sensors of a first touch interface, the first touch interface comprising an optical touch interface; and
   disregarding touch contact information from the first touch interface in response to receiving touch contact information from the first touch interface;
   translating the touch position determined by the first interface module into a user interface response comprising a cursor movement prior to a second interface module detecting a touch contact;
   detecting the touch contact from the one or more touch-sensitive sensors of the second touch interface concurrent with the first interface module determining the touch position, the second touch interface being of a different type than the first touch interface;
   disregarding touch position information from the second touch interface in response to receiving the touch position information from the second touch interface; and
   combining the touch position determined by the first touch interface with the touch contact detected by the second touch interface into a touch event.

12. The computer program product of claim 11, wherein the second touch interface comprises one of a capacitive touch interface or a surface acoustic wave (SAW) touch interface.

13. The computer program product of claim 11, wherein the second touch interface comprises a limited touch interface having one or more of limited touch contact sensing and touch position sensing capabilities.

* * * * *